INVENTOR
GUNTER STRAUFF

BY Glascock, Downing & Seebold

ATTORNEYS

United States Patent Office 3,523,420
Patented Aug. 11, 1970

3,523,420
HYDRAULIC BOOSTER ASSEMBLAGE
Gunter Strauff, Kaarst, Germany, assignor to
Langen & Co., Dusseldorf, Germany
Filed Nov. 5, 1968, Ser. No. 773,571
Int. Cl. F15b 7/00
U.S. Claims 60—54.5                                                      5 Claims

ABSTRACT OF THE DISCLOSURE

A hydraulic booster assembly which is provided with transmitter and booster pistons in which the transmitter piston is of lesser diameter than the booster piston and for a rapid bridging of idle strokes or the like, a rigid connection exists between the transmitter and booster piston so long as an external actuating force on the booster piston does not exceed a certain value but upon such force being exceeded, the rigid connection is interrupted and the actual boost develops.

BACKGROUND OF INVENTION

The invention relates to a hydraulic booster assemblage.

Such boosters are frequently used such as for example, in motor vehicles for the operation of brakes or clutches. In order to shorten the time period for bridging the pedal play or filling elastic connections, a boost is forgone initially and which, as is known, can be realized only in exchange for increased paths of actuation in the event there is no outside source of pressure. When the actuating force has reached a certain value, such as for instance, at the initiation of a braking operation, a boost automatically occurs and the magnitude thereof is dependent on the effective surfaces of the transmitter piston and the booster piston respectively. A known design (H. Buschmann, P. Koessler, Taschenbuch für den Kraftfahrzeugingenieur [Manual for the Motor Vehicle Engineer], 7th Edition, page 690, Deutsche Verlagsanstalt, Stuttgart), in order to attain the desired results employs, as a transmitter piston, a stepped piston whose annular space is connected with the piston space via a check valve which opens in the direction of the piston space. Moreover, the annular space is coupled with a reservoir via pressure limiting valve as well as forwardly directed channels provided in the stepped piston. A releasing piston which responds to the pressure difference between the piston space and the annular space opens the pressure limiting valve upon a certain pressure difference being exceeded in order that liquid can flow from the annular space substantially without loss. In this booster assemblage, there is initially operative the entire volume of liquid displaced jointly from the annular space and from the piston space whereas at full boost only the liquid which is displaced from the piston space is operative. The secondary intake during the reverse stroke occurs by means of check valves and a reliable operation is assured only if and when there is a perfect opening and closing of the pressure limiting valve and the check valves.

SUMMARY OF INVENTION

An object of this invention is to provide a booster assembly of the above mentioned type which is so constructed that the desired function can be realized with relatively simple, sturdy components and without the employment of valves susceptible to trouble.

Furthermore, emergency operation without boost is possible by mechanical means in the event the hydraulic system fails.

The solution of the problem is solved according to the invention by the combination of the following:

(1) the transmitter piston biases itself against the booster piston over a pre-stressed spring
(2) the transmitter piston slides over a portion of length thereof in a bore provided in the booster piston and
(3) the annular space defined by the transmitter piston, booster piston, and cylinder is connected with a reservoir zone by means of channels in the transmitter piston and/or in the booster piston together with the bore and forward leading conduit means with such channels being controlled closed upon a relative movement between the transmitter piston and the booster piston.

In a first embodiment of the invention, the transmitter piston may be defined by a stepped piston slidable by a portion thereof of smaller diameter in a bore formed in the booster piston with such bore always being connected with the reservoir zone and for realizing a limit actuating force with the annular space.

In a further embodiment of the invention, the annular space may be permanently connected with the bore while a connection between the bore and the reservoir zone is controlled closed when the limit actuating force is exceeded and the relative movement between the transmitter piston and the booster piston in both directions may be then limited by stops.

To facilitate the filling of the various spaces, the liquid in the reservoir zone may be under excess pressure.

DETAILED DESCRIPTION OF THE INVENTION

Figure 1:
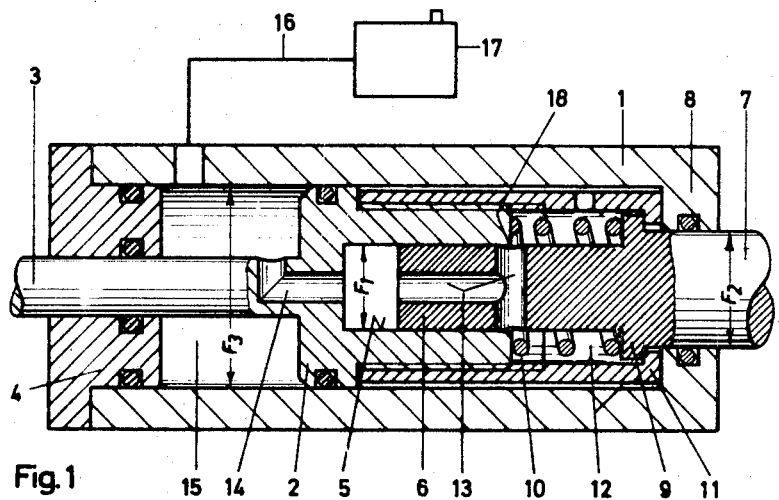
FIG. 1 is a cross-sectional view illustrating the invention in which the bore in the booster piston is permanently connected with a reservoir zone.

As shown in FIG. 1, the booster assemblage includes a cylinder 1 in which a booster piston 2 is slidable under sealing conditions and the piston 2 is provided with a piston rod 3 which is guided in a seal-type manner in a cover or lid 4 which closes one end of the cylinder 1. The piston 2 is provided with an axial bore 5 in which slides a reduced portion 6 of a transmitter piston 7. The piston 7 is guided under sealing conditions in a bottom or base 8 of the cylinder 1.

The transmitter piston 7 is provided with a collar or flange 9 which functions as an abutment for one end of a spring 10 while the other end of the spring bears against the free end of the booster piston 2. A recessed sleeve 11 is threaded onto booster piston 2 and serves as a stop means in connection with the collar or flange 9 of the piston 7. The annular space defined by the transmitter piston 7, the booster pitson 2 and the cylinder 1 of bottom 8 is denoted 12. The space 12 communicates with the bore 5 of the piston 2 by means of channels 13 formed in the piston 7 and the bore 5 is permanently connected with a reservoir zone 17 by means of a channel 14, annular space 15 defined between cylinder 1, the piston rod 3, the cover 4 and the piston 2 and a conduit 16.

The cross-sectional area of the transmitter piston 7 is denoted F2, the cross-sectional area of the reduced portiontion thereof F1 and the cross-sectional area of the booster piston 2 F3. The front or free end control edge of the piston 2 is denoted 18.

Figure 2:
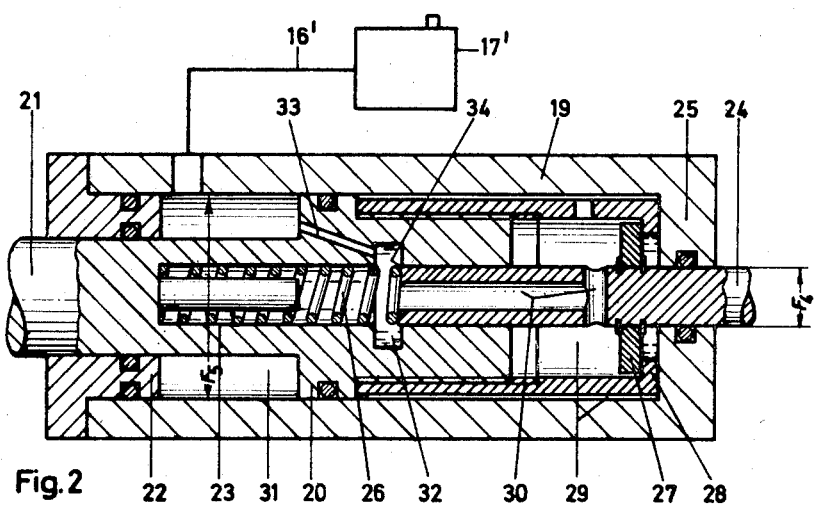
FIG. 2 is a view generally similar to FIG. 1 illustrating the invention with the bore in the booster piston being permanently connected with the annular space.

Referring now to FIG. 2, there is provided a cylinder 19 in which a booster piston 20 is disposed for sliding movement under seal and the piston is provided with a piston rod 21 which extends through a cover or lid 22 closing one end of the cylinder under sealing conditions. The piston 20 is formed with an axially extending bore 23 in which a transmitter piston 24 is slidably disposed and the piston extends under sealing conditions through a bottom or base 25 of the cylinder 19. A spring 26 is located in the bore 23 and one end of the spring bears against the transmitter piston 24 and the opposite end against the booster piston 20 or the piston rod 21. A collar or flange 27 is positioned on the transmitter piston 24 and the collar in conjunction with a recessed sleeve 28 threaded onto the booster piston 20 limits the relative movement between the transmitter piston 24 and the booster piston 20. An annular space 29 constituted by the cylinder 19, the botom or base 25, the transmitter piston 24 an dthe booster piston 20 is permanently connected with the axial bore 23 via channels 30 formed in the transmitter piston 24. An annular space 31 located between the cover 22, the cylinder 19, the piston rod 21 and the booster piston 20 is connected with the bore 23 by means of an annular space 32 and a channel 33. The annular space 31 is in communication with a reservoir zone 17' by means of a line or conduit 16'. The front end control edge of the transmitter piston 24 is denoted 34. The cross-sectional area of the transmitter piston 24 is indicated F4 and the cross-sectional area of the booster piston 20 F5.

The operation of the booster assemblage is as follows:

An external actuating force is exerted on the transmitter piston 7 (FIG. 1) and as long as the reaction force that the piston rod 3 does not exceed a value corresponding to the initial tension of the spring 10, the spring 10 must be considered as a rigid connection between the transmitter 7 and the booster piston 2. Hence, it will be appreciated that below a limit actuating force corresponding to the spring tension, the transmitter piston 7 and the booster piston 2 travel equal distances. With such a movement, the volume of the annular space 15 decreases whereas the volume of the annular space 12 increases and the necessary compensation of liquid develops via the channels 13 and 14 together with the bore 5. This compensation is facilitated if the liquid is under a slight excess pressure and when the actuating force is exceeded, the spring 10 is compressed. The channel 13 is closed by the control edge 18 thereby interrupting the connection between the spaces 12 and 15.

While the bore 5, the channel 14, the space 15 and the conduit 16 continue to be under the pressure existing in the reservoir zone 17, upon further relative movement between the transmitter piston 7 and the booster piston 2 a higher pressure develops in the annular space 12. This pressure functions on the effective area F2–F1 of the piston 7 and on the effective area F3–F1 of the booster piston 2. Since the area F3 is greater than the area F2 a higher force always acts on the booster piston 2 than on the transmitter piston 7. The distance is traversed or inversely proportional to the effective areas and during the boosting operation, the volume of the annular space 12 remains constant except for any leakage losses occurring so that during the reverse strokes substantially no liquid volume is required to be admitted. Following the opening of the control edge 18 (during joint reverse stroke) the liquid is then displaced from the annular space 12. The booster assemblage is so constructed that a transmission of force is also possible at deficient liquid filling but a longer distance must then be traversed without a boost.

With the booster assemblage as disclosed in FIG. 1 very great boosts can be realized by making the area difference F2–F1 small as compared with the areas F3–F1. If a non-stepped smooth piston is desired as the transmitter piston, the embodiment illustrated in FIG. 2 is preferable. In contrast to the embodiment of FIG. 1. it will be noted that the total area F4 of the transmitter piston 24 is effective. After the limit actuating force has been exceeded, and by reasons of the resultant relative movement between the transmitter piston 24 and the booster piston 20, the annular groove is passed over by the control edge 34 in order that the channel 33, space 31, line 16' and reservoir zone 17' are not in communication with the annular space 29. With a smooth transmitter piston 24, it is not possible to obtain boost ratios of any magnitude. While with the embodiment illustrated in FIG. 1, the effective area F2–F1 of the transmitter piston may assume any desired small angle on the one hand could become equal to or greater than the effective area F3–F1 of the booster piston 2 on the other hand, in the FIG. 2 embodiment employing the smooth piston 24 there applies the relationship zero less than F4 less than F5. This relationship is effective due to the fact that the transmitter piston 24 must have a finite thickness and also have a smaller diameter than the booster piston 20 since the transmitter, piston is guided therein. Naturally, a stepped piston may also be employed in the FIG. 2 embodiment and by means of which any desired low boost ratios can be realized.

It is of course to be understood that other constructional arrangements are possible within the scope of the invention and for example, the channels in the transmitter pistons may be replaced by corresponding channels in the booster pistons and the springs may be arranged either in the annular space or in the bores of booster piston. Furthemore, it is not essential to provide the booster piston with a piston rod and such component could be in the form of a plunger piston in which situation it is necessary only to provide an annular groove corresponding to the length of the stroke.

What I claim is:

1. A hydraulic booster assemblage of the type having transmitter and booster pistons in which the transmitter piston is of lesser diameter than the booster piston and for a rapid bridging of idle strokes, a rigid connection exists between the transmitter piston and the booster piston so long as an external actuating force on the booster piston does not exceed a certain value but upon such force being exceeded, the rigid connection is interrupted and an actual boost develops, the improvement comprising a cylinder, a booster piston reciprocable therein, said booster piston having an axial bore, a transmitter piston, said transmitter piston being slidable over a portion of its length in said axial bore, a pre-stressed spring biased between the booster piston and the transmitter piston, said transmitter piston, booster piston and cylinder defining an annular space, said booster piston and cylinder defining a second space, a liquid reservoir, said transmitter piston and booster piston having channels therein for providing communication between said annular space and said second space, and means providing communication between said second space and said reservoir with said channels being controlled closed upon relative movement between the transmitter piston and the booster piston.

2. The hydraulic booster assemblage as claimed in claim 1 in which said transmitter piston is a stepped piston, with the portion thereof of small diameter being the portion of its length slidable in said axial bore and said axial bore being in permanent connection with the reservoir and with said annular space.

3. The hydraulic booster assemblage as claimed in claim 1 in which said annular space is permanently connected with said axial bore and a connection between said axial bore and reservoir is controlled closed when the limit actuating force is exceeded.

4. The hydraulic booster assemblage as claimed in claim 1 in which the relative movement between the said transmitter piston and booster piston is limited by stops.

5. The hydraulic booster assemblage as claimed in claim 1 in which the liquid in said reservoir is under pressure in excess of that of said bore, spaces, and channels.

References Cited

UNITED STATES PATENTS 1,939,788  12/1933  Olson.
2,134,780  11/1939  Doyle.
3,425,219  2/1969  Oliver et al.

MARTIN P. SCHWADRON, Primary Examiner

R. BUNEVICH, Assistant Examiner

U.S. Cl. X.R.

60—10.5